Nov. 10, 1953    R. L. CORDELL    2,659,065
SEISMOMETER
Filed Aug. 11, 1950    2 Sheets-Sheet 1

INVENTOR:
Ralph L. Cordell
BY Newell Pottorf
ATTORNEY

Nov. 10, 1953 R. L. CORDELL 2,659,065
SEISMOMETER
Filed Aug. 11, 1950 2 Sheets-Sheet 2

INVENTOR:
Ralph L. Cordell
BY Newell Pottorf
ATTORNEY

Patented Nov. 10, 1953

2,659,065

UNITED STATES PATENT OFFICE 2,659,065

SEISMOMETER

Ralph L. Cordell, Tulsa, Okla., assignor to Stanolind Oil and Gas Company, Tulsa, Okla., a corporation of Delaware Application August 11, 1950, Serial No. 178,856

10 Claims. (Cl. 340—17)

This invention relates to geophysical surveying and is directed particularly to a seismometer adapted for seismic surveying either on land or water. It is especially useful for work in water-covered areas, utilizing a plurality or spread of seismometers adapted for towing behind a vessel and for work on land employing large numbers of seismometers in a spread.

Conventional seismometers for land seismic surveying have heretofore always required some care in planting or orientation so as to have their maximum response in the direction of arrival of the desired energy. Also, for the most part seismometers adapted for use in marine seismometer spreads towed behind exploring vessels have either required some means of maintaining the seismometers in an upright position, while permitting twisting or turning of the towing cable, or have required that the seismometers be made self-righting by mounting in gimbals or trunnions, so that they remain in the desired orientation. This has been necessary both because seismometers normally have their major response only in one direction and because in reflection seismic surveying it is ordinarily desirable to have the direction of major sensitivity of the pickup substantially vertical to receive the vertically traveling compressional waves. In marine surveying, the provision of external righting means, or the mounting of the seismometer in gimbals, however, has the disadvantage of making the mechanism somewhat bulky and difficult to handle, as well as increasing the towing force required to pull the seismometer spread through the water. Planting or orientation of the individual seismometers on land inevitably requires some time and thus constitutes an item of expense.

It is accordingly a primary object of my invention to provide a seismometer which is freely rotatable about an axis and does not require care in planting or the use of gimbals or external devices exerting orienting force on the seismometer. Another object is to provide a seismometer construction readily adaptable to streamlining and of substantially less bulky dimensions that the usual seismometer, or seismometer mounting. Still another object is to provide a simple, rugged, and inexpensive seismometer construction having a primarily vertical response, regardless of the rotation of the seismometer housing about a horizontal axis. Other and further objects, uses, and advantages of the invention will become apparent as the invention proceeds.

The foregoing and other objects are accomplished, according to my invention, by a seismometer which, in general, is cylindrically symmetrical about a horizontal axis. It comprises a permanent magnet and pole-pieces which provide at least one annular gap in the magnetic structure, the plane of which gap is substantially vertical; an elastically supported mass generally coaxial with the gap, but more or less unsymmetrically positioned relative thereto, due to the gravitational pull on the mass, which pull causes flexing of the elastic suspension; and a pickup coil, also generally coaxial with the gap, enclosing at least a portion of the magnetic flux in the structure, which enclosed flux is varied by movements of the mass relative to its support, thereby inducing in the coil a voltage related to the relative movements of the mass and suport.

These principles are embodied in each of a plurality of suspended-mass seismometer systems; for example, an electrodynamic type in which the coil is coupled with or forms a part of the suspended mass and by its changing position in the gap encloses varying magnetic flux; or a variable-reluctance type in which the coil is stationary relative to the magnetic structure, but movements of the mass relative to the structure alter the flux in that part enclosed by the coil; or combinations of these or other types.

This will be better understood by referring to the accompanying drawings forming a part of this application and illustrating in the different figures several embodiments of the principle of the invention. In these drawings.

Figure 5:
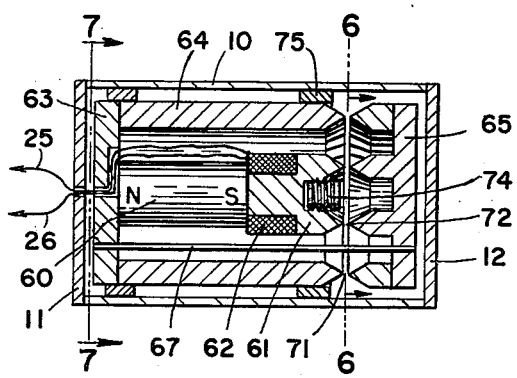
Figures 6, 7:
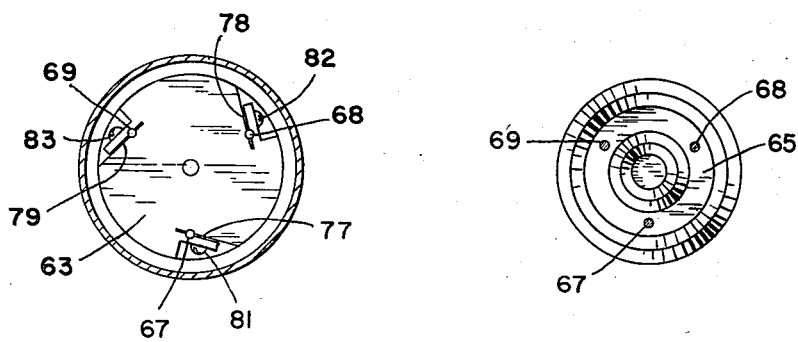

Figure 5 is a cross-section view of a variable reluctance-type seismometer embodying the invention; and, Figures 6 and 7 are cross-section views taken respectively on the lines 6—6 and 7—7 of Figure 5.

Figure 1:
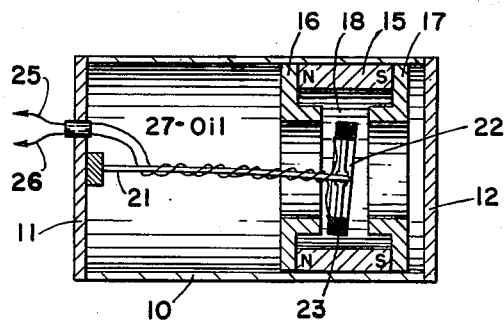
Figure 1 is a cross-section view of a simplified seismometer construction embodying the invention.

Referring now particularly to Figure 1, a simple embodiment of the seismometer of my invention comprises an external housing 10, preferably but not necessarily in the form of a horizontal cylindrical shell, having end closure members 11 and 12, either or both of which are removable for assembling the instrument. Fixed within housing 10 is a cylindrically symmetrical magnetic structure formed by a cylindrical or annular permanent magnet 15, magnetized parallel to its longitudinal axis, and a pair of annular pole pieces 16 and 17 extending radially inwardly from the housing 10 and forming an annular gap 18, the plane of which gap (or the face of each pole piece 16 and 17 forming the gap) is substantially vertical.

Elastically supported within gap 18, by a cylindrical cantilever spring 21 having one end fixed to the center of member 11, is a mass 22 comprising a coil 23 generally coaxial with the gap 18 but unsymmetrically positioned therein due to the downward deflection of spring 21 by the gravitational pull on mass 22. The ends of coil winding 23 are brought out to insulated electrical leads 25 and 26 which, in operation, are connected to amplifying and recording equipment, not shown, which may be of any conventional type used in seismic surveying.

If a "mean gap radius" is defined as the radius of that circle, taken with reference to the axis of the cylindrical magnetic structure, outside of which lies one half of the flux crossing gap 18 and inside of which lies the other half of the flux (to a sufficiently close approximation this is the same as the mean radius $r_m$ of the face areas of pole pieces 16 and 17:

$$r_m = .707\sqrt{r_1^2 + r_2^2}$$

where $r_1$ and $r_2$ are the radii of the inner and outer edges of the pole face); and if a "mean coil radius" is defined in an analogous way as the radius on each side which lies one-half of the coil turns; then it is preferred in this invention that the mean gap radius and the mean coil radius have somewhat different values, for example, that the mean coil radius be less than the mean gap radius. This insures that, as the coil 23 assumes an unsymmetrical position in gap 18 due to the gravitational pull on mass 22 deflecting spring 21, the upper and lower halves of the coil are in magnetic fields of different strength, and a movement of the coil results in a change in the net flux through it. Otherwise, if the coil were symmetrically located in and of the same mean radius as the gap, a change in flux through the upper half of the coil would be exactly offset by an equal and opposite change through the lower half, and no output voltage would be produced. It will be understood that the same considerations apply if the mean coil radius is larger than the mean gap radius.

For damping the oscillations of coil 23, housing 10 may be filled with fluid such as oil 27, or, as is well known in this art, the resistance of the coil and its external circuit may be adjusted to provide electromagnetic damping in cooperation with the magnetic field across gap 18.

Figure 2:
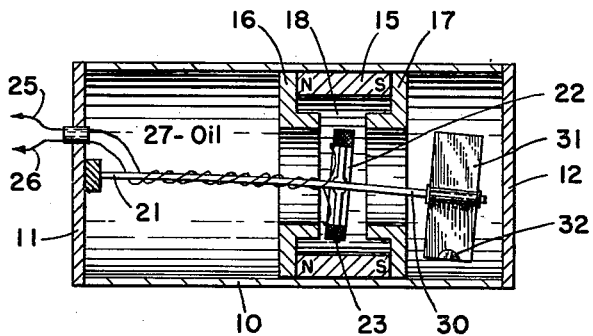
Figure 2 is a cross-section view of a seismometer having decreased lateral response.

Although the response of this seismometer to horizontal relative movements of the coil and magnetic field structure is theoretically negligible, if it happens that the cylindrical symmetry of the magnetic field or of the spring 21 is not perfect, then the modification shown in Figure 2 is desirable. Pivotally mounted on an extension 30 of spring 21 as an axis of rotation is a flat vane 31 having substantially equal areas above and below its axis of rotation. It is held always in a vertical plane by a weight 32 or equivalent which causes it to act like a pendulum and remain stationary if housing 10 and extension 30 rotate. When housing 10 is filled with oil 27 for damping, however, horizontal movements of the housing and oil are transmitted by the oil to vane 31 and to coil 23, so there is little or no relative motion between the coil and the magnetic field across gap 18. For vertical housing motions, on the other hand, the edge of the vane presents a negligibly small frontal area, so that the desired relative movements of coil and magnetic field can take place virtually the same as with the embodiment of Figure 1.

Figure 3:
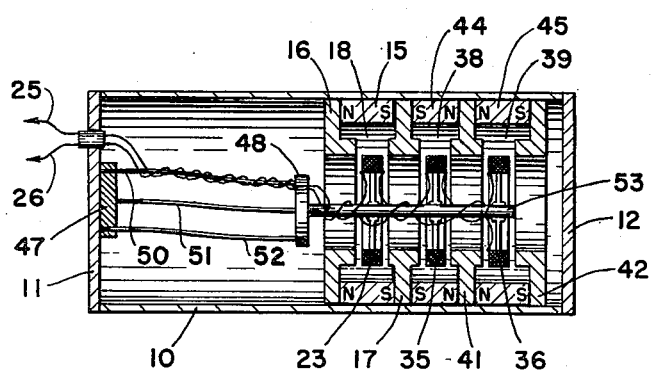
Figure 3 is a cross-section view of a seismometer utilizing a multiple coil and magnetic-field structure for increased output.

The modification of the invention shown in Figure 3 possesses at least two features frequently of advantage over those embodiments described above. A plurality of coils and magnetic gaps are employed to provide greater output voltages if the coils are connected in series, or lower resistance if they are connected in parallel. Also, the spring suspension maintains the planes of the coils accurately parallel to the planes of the gaps so that the gaps may be made correspondingly shorter with decreased reluctance and greater available flux.

Thus, in addition to the coil 23 in the gap 18, formed by the pole pieces 16 and 17 associated with the magnet 15, there are provided similar coils 35 and 36, respectively located in gaps 38 and 39, formed by pole pieces 41 and 42 cooperating with annular magnets 44 and 45. The polarities of magnets 15, 44, and 45 are alternated so as to provide the appropriate fluxes across the gaps 18, 38, and 39, and the coils 23, 35, and 36 are connected in the proper electrical sequence and to the output leads 25 and 26 to give the desired series or parallel operation.

The spring suspension of this multiple mass-coil system is a double cantilever type consisting of two spaced clamping disks 47 and 48 clamping the ends of a plurality of (at least three) spring wires or rods 50, 51, and 52, preferably each parallel to the cylindrical axis and spaced equiangularly around it. Disk 47 is fastened to the center of housing end member 11, while from the center of disk 48 projects a mandrel 53 along which the coils 23, 35, and 36 are attached in spaced relation.

As, for a given deflection, all of springs 50, 51, and 52 flex equally and in the same direction, disks 47 and 48 always remain parallel, and the planes of coils 23, 35, and 36 similarly remain parallel to the pole faces in gaps 18, 38, and 39.

If desired, separate leads can be brought out from any of the multiple coils for electromagnetic damping by the proper value of external resistance, for electrical feedback purposes, or the like. Alternatively, or in addition, damping can be provided by oil 27 filling the housing 10.

Figure 4:
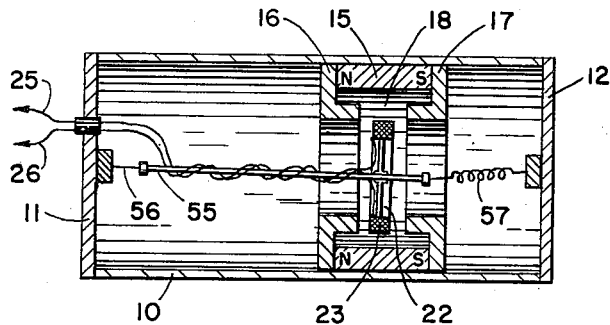
Figure 4 is a cross-section view of a seismometer with a modified spring suspension of the mass.

Another method of spring-suspending the coil 23 having certain advantages is shown in Figure 4. Thus, the coil 23 may be mounted on a rod 55 extending part or most of the way from the coil toward the end 11 of the housing 10, with a flexible fiber 56, attached between the rod 55 and the end 11 of the housing, providing a hinge for the suspended system. An axial tension spring 57 extends between the other end of rod 55 and the other end 12 of housing 10. As before, due to the gravitational pull on the mass of the suspended system, coil 23 hangs non-symmetrically in the gap 18. An advantage of this suspension is that, for a given deflection, the plane of coil 23 remains more nearly parallel to the magnetic gap than in the embodiments of Figures 1 and 2, and axial symmetry may be easier to achieve than with the embodiment of Figure 3.

An example of the application of the principle of horizontal cylindrical symmetry to a variable-reluctance type of seismometer is shown in Figures 5, 6, and 7. The permanent magnet 60 in the form of a short, solid cylinder is provided with a central pole piece 61 which also forms a core for the coil 62 which is here stationary and not part of the moving mass as in the previous embodiments. The other pole piece for magnet 60 comprises the disk 63, which may also serve as one of the spring-clamping disks, and the outer cylindrical shell 64. A bridging ferromagnetic member 65 between shell 64 and inner central pole 61 completes the magnetic circuit, member 65 also serving as the movable suspended mass and as the other clamping disk for the three double-cantilever spring rods 67, 68, and 69 (Figure 6).

Between member 65 and shell 64 and pole 61, respectively, are narrow gaps 71 and 72, the pole faces across these gaps being cut with sharp knife-edges facing each other, as shown, rather than having flat opposing faces. The magnetic field bridging these gaps is accordingly highly non-uniform, and small movements of the mass 65 produce large changes in the total reluctance of the magnetic circuit and correspondingly large voltages in coil 62.

The sensitivity of this system is further increased by a threaded ferromagnetic insert 74 in the center of center pole 61. Adjusting the longitudinal position of insert 74 toward the bridging member 65 brings the system toward a position of mechanical instability due to the distrotion of the magnetic field across gap 72, at the same time lowering the apparent resonant frequency of the spring-mass system and increasing the electrical output. Much the same function can be performed for the outer gap 71 by a slidably adjustable ferromagnetic collar 75, here serving as a spacer between shell 64 and outer housing 10.

Figure 7 shows the preferred manner of holding the cantilever spring rods in the clamping disks. Thus, the disk 63, for example, is provided with slots 77, 78, and 79 extending from the periphery of the disk through the holes in which the spring rods 67, 68, and 69 are inserted. Screws 81, 82, and 83, threaded into the main body of disk 63, are tightened to pull these slots closed and grasp rods 67, 68, and 69 after they are in place.

While my invention has been described in detail in terms of the foregoing specific embodiments, it is to be understood that still further modifications combining the disclosed features in other ways will be apparent to those skilled in the art. The scope of the invention therefore should not be considered as limited to these specific details, but is to be ascertained from the appended claims.

I claim:

1. A seismometer comprising a housing, a magnetic structure within said housing including a permanent magnet and pole pieces associated therewith, said pole pieces having faces forming at least one annular air gap, the plane of which gap is substantially vertical and across which gap the magnetic field is cylindrically symmetrical about a horizontal axis, a mass, elastic means attached to at least one end of said housing and extending generally parallel to said axis for supporting said mass from said housing generally coaxially within said gap but unsymmetrically positioned relative thereto due to the gravitational pull on said mass, and a coil enclosing at least a portion of the flux in said structure which crosses said gap, whereby movements of said mass in said gap alter the flux threading said coil.

2. A seismometer as in claim 1 wherein said coil is coaxial with and attached to said mass.

3. A seismometer as in claim 1 wherein said coil is coaxial with said gap and encircles one of said pole pieces.

4. A seismometer comprising a housing, a magnetic structure within said housing including a permanent magnet and pole pieces associated therewith, said pole pieces having faces forming at least one annular air gap, the plane of which gap is substantially vertical when said seismometer is in operating position to respond to vertical displacements, and across which gap the magnetic field is cylindrically symmetrical about a horizontal axis, a mass, elastic means comprising at least one cylindrical spring attached between said mass and one end of said housing and extending generally in the direction of said horizontal axis, said mass being unsymmetrically positioned relative to said gap due to the gravitational pull on said mass causing bending of said spring, and a coil enclosing at least a portion of the flux in said structure which crosses said gap, whereby movements of said mass parallel to the plane of and in said gap alter the flux threading said coil.

5. A seismometer comprising a housing, a cylindrical spring fastened by one end to and extending approximately horizontally through said housing, a mass fixed to the free end of said spring, a coil associated with said mass and having its axis parallel to said spring at the point of attachment, an annular magnet attached to said housing and surrounding said coil, and annular pole pieces associated with said magnet for producing across an annular gap in which said coil is located a cylindrically symmetrical magnetic field approximately perpendicular to the plane of said coil, said coil being unsymmetrically located in said gap due to the flexing of said spring by the gravitational pull acting on said mass.

6. A seismometer comprising a horizontal cylindrical housing, an annular magnet fixed within said housing, pole pieces associated with said magnet forming an annular gap lying in a vertical plane generally perpendicular to the axis of said housing, a coil within said gap of smaller mean radius than the mean radius of said gap, and spring means suspending said coil from said housing such that said coil is free to move relative to said housing substantially in the plane of the coil, said coil being unsymmetrically located in said gap due to the flexing of said spring means by the gravitational pull acting on said mass.

7. A seismometer comprising a horizontal cylindrical housing, a coil in said housing with its axis approximately parallel to the housing axis, spring means resiliently suspending said coil from said housing such that said coil is free to move in the plane of the coil relative to said housing, an annular magnet surrounding said coil and fixed to said housing, pole pieces associated with said magnet and forming a vertical annular gap in which said coil is located and producing a cylindrically symmetrical magnetic field substantially perpendicular to the plane of said coil, and a damping liquid substantially filling the interior of said housing for damping the oscillations of said coil relative to said housing.

8. A seismometer according to claim 7 having a vane associated with and rotatable about the axis of said coil, said vane having substantially equal areas but different masses above and below its axis of rotation, whereby it remains in a substantially vertical plane.

9. A seismometer comprising a horizontal cylindrical housing, an annular magnet within and fixed to said housing, pole pieces associated with said magnet forming an annular gap of smaller diameter than said housing and lying in a vertical plane perpendicular to the housing axis, a coil within said gap of smaller mean radius than the mean radius of said gap, a rigid rod attached to said coil and extending along its axis, a flexible fiber attached between one end of said rod and the center of one end of said housing, and a tension spring connected between the other end of said rod and the center of the other end of said housing, whereby said coil is free to move in any direction in the plane perpendicular to its axis.

10. A seismometer comprising a permanent magnet, pole pieces associated with said magnet having at least one annular pole face and at least one other pole face concentric therewith, at least one of said pole pieces having a movable ferromagnetic member close to the pole face to adjust the reluctance of the adjacent gap to a critical value, a ferromagnetic mass spaced by narrow vertical gaps from each of said pole faces and substantially closing the magnetic circuit between them, spring means suspending said mass resiliently for movement in a vertical plane relative to said pole faces, said spring means comprising at least three parallel cylindrical rods clamped at each end to form double cantilever springs, and a coil encircling one of said pole pieces, whereby movements of said mass vary the magnetic reluctance across said gaps and induce corresponding electric voltages in said coil.

RALPH L. CORDELL.

References Cited in the file of this patent

UNITED STATES PATENTS

| Number | Name | Date |
|---|---|---|
| 2,111,643 | Salvatori | Mar. 22, 1938 |
| 2,311,079 | Par, Jr. | Feb. 16, 1943 |
| 2,372,056 | Broding | Mar. 20, 1945 |
| 2,548,990 | McLoad | Apr. 17, 1951 |
| 2,591,795 | Eisler | Apr. 8, 1952 |